US011244250B2

(12) United States Patent
Deichmann

(10) Patent No.: US 11,244,250 B2
(45) Date of Patent: Feb. 8, 2022

(54) DETERMINING STATES OF AN APPARATUS USING SUPPORT VECTOR MACHINES

(71) Applicant: SIEMENS AKTIENGESELLSCHAFT, Munich (DE)

(72) Inventor: Jonas Deichmann, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/270,000

(22) PCT Filed: Aug. 15, 2019

(86) PCT No.: PCT/EP2019/071895

§ 371 (c)(1),
(2) Date: Feb. 19, 2021

(87) PCT Pub. No.: WO2020/038815

PCT Pub. Date: Feb. 27, 2020

(65) Prior Publication Data

US 2021/0312335 A1 Oct. 7, 2021

(30) Foreign Application Priority Data

Aug. 20, 2018 (EP) .................................... 18189722

(51) Int. Cl.
*G06N 20/10* (2019.01)
*G06N 5/04* (2006.01)

(52) U.S. Cl.
CPC ............... *G06N 20/10* (2019.01); *G06N 5/04* (2013.01)

(58) Field of Classification Search
None
See application file for complete search history.

(56) References Cited

U.S. PATENT DOCUMENTS

2015/0293523 A1 10/2015 Yamamoto et al.
2017/0317497 A1 11/2017 Lee
(Continued)

FOREIGN PATENT DOCUMENTS

CN 103136587 A 6/2013
CN 107256003 A 10/2017
(Continued)

OTHER PUBLICATIONS

Sun, et al., Fault Diagnosis Model of Photovoltaic Array Based on Least Squares Support Vector Machine in Bayesian Framework, 2017, Appl. Sci. 2017, 7, 1199, pp. 1-14 (Year: 2017).*
(Continued)

*Primary Examiner* — Wilbert L Starks
(74) *Attorney, Agent, or Firm* — Lempia Summerfield Katz LLC

(57) ABSTRACT

The invention relates to a system and to a method for determining a state of a device by means of a trained support-vector machine. According to the invention, an operating parameter space is divided into classification volumes, at least one of which indicates a normal state and at least one other of which indicates a fault state of the device. A current state of the device can therefore be determined by determining where a current operating parameter point is to be arranged in the operating parameter space. The invention further relates to methods and to variants of the system in order to facilitate a cause evaluation and to determine particularly relevant operating parameters for the fault determination.

6 Claims, 3 Drawing Sheets

(56) References Cited

U.S. PATENT DOCUMENTS

| | | | |
|---|---|---|---|
| 2018/0081349 | A1 | 3/2018 | Lu et al. |
| 2019/0210176 | A1 | 7/2019 | Yamamoto |

FOREIGN PATENT DOCUMENTS

| | | | |
|---|---|---|---|
| CN | 107831737 | A | 3/2018 |
| DE | 102008058422 | A1 | 5/2010 |
| EP | 3240166 | A1 | 11/2017 |
| EP | 3296822 | A2 | 3/2018 |
| WO | 2018030033 | A1 | 2/2018 |

OTHER PUBLICATIONS

Tian, et al., Nonparallel Support Vector Machines for Pattern Classification, IEEE Transactions on Cybernetics, 2013, pp. 1-99 (Year: 2013).*

Hsu, Chih-Wei, Chih-Chung Chang, and Chih-Jen Lin. "A practical guide to support vector classification." (2003—updated Apr. 2010). pp. 1-17.

Notice of Submission the International Provisional Patentability Report for International Patent Application No. PCT/EP2019/071895 dated Jul. 14, 2020.

Hsu, Chih-Wei, Chih-Chung Chang, and Chih-Jen Lin. "A practical guide to support vector classification." (2016): 1-16.

International Search Report and the Written Opinion for International Patent Application PCT/EP2019/071895 dated Jan. 13, 2020.

International Preliminary Report on Patentability for PCT/EP2019/071895 dated Jul. 14, 2020, with English translation.

C. W. Hsu, C. C. Chang and C. J. Lin, "A Practical Guide to Support Vector Classification," Technical Report, Department of Computer Science and Information Engineering, University of National Taiwan, Taipei, 2003, pp. 1-12.

Chinese Office Action for Chinese Application No. 201980054387.X dated Aug. 20, 2021.

* cited by examiner

DETERMINING STATES OF AN APPARATUS USING SUPPORT VECTOR MACHINES

This application is the National Stage of International Application No. PCT/EP2019/071895, filed Aug. 15, 2019, which claims the benefit of European Patent Application No. EP 18189722.4, filed Aug. 20, 2018. The entire contents of these documents are hereby incorporated herein by reference.

BACKGROUND

Modern apparatuses are often equipped with a number of sensors that may capture a wide variety of operating parameters of the apparatus before, after, or during operation. Certain constellations of operating parameters may indicate, under certain circumstances, that an apparatus is in a normal state or, conversely, may indicate that the apparatus is in a fault state.

In the case of a large number of operating parameters, the sometimes complex relationships between the operating parameters, which may result in fault states, are often concealed. The gain in measurements for operating parameters therefore sometimes results in a deterioration, rather than an improvement, in the fault monitoring for the apparatus since, in difficult cases, relevant operating parameter values may be hidden in a number of other operating parameter values, for example, and may therefore no longer be resolved.

In solutions in the prior art, it is therefore very complicated to accurately capture the state of the apparatus from the number of captured operating parameters. In addition, on account of the sometimes complex relationships in the prior art, it is also very difficult to establish a cause of a fault state. The cause has hitherto usually been found by experts in a respective specialist field of the apparatus by superimposing curve representations or the like in tedious manual work.

Support vector machines (SVM) are known from the field of machine learning. Such support vector machines are trained using training data in a parameter space in order to generate boundaries (e.g., "class boundaries" or "classification boundaries") between different classification volumes of the parameter space such that an area that is as broad as possible remains as free of the training data as possible around these boundaries. After the support vector machine has been trained in this manner, the generated class boundary may be used to determine the classification volume in which a particular point (e.g., a point previously unknown to the support vector machine) is positioned in the parameter space. In this manner, support vector machines make it possible to classify n-dimensional points.

A textbook that deals with the use of support vector machines for pattern classification is, for example, the book by Shigeo Abe: "Support vector machines for pattern classification", Springer-Verlag London 2010, second edition.

EP 3 296 822 A2 describes a method for determining a mismatch between a plant and models for plants, in which a support vector machine may be used to determine whether or not a specific plant is in the region of a cluster of "good" models.

US 2015/293523 A1 describes a machine-tool diagnostic method and a machine-tool diagnostic system using a 1-class support vector machine.

DE 10 2008 058422 A1 describes a method in which a laser machining operation is provided with a characteristic value that may be provided by a support vector machine.

SUMMARY AND DESCRIPTION

The scope of the present invention is defined solely by the appended claims and is not affected to any degree by the statements within this summary.

The present embodiments may obviate one or more of the drawbacks or limitations in the related art. For example, states of an apparatus, such as an electrical machine, are accurately determined.

A computing device may be, for example, a processor with an associated memory, a cloud computing platform, a microcontroller, an application-specific integrated circuit (ASIC), and/or the like.

The capture device may include, for example, a plurality of sensors, where each sensor of the plurality of sensors is configured to capture at least one operating parameter of the apparatus during operation. For example, an electrical current may be captured by an electrical current sensor, a temperature may be captured by a temperature sensor, an electrical voltage may be captured by an electrical voltage sensor, etc.

In some embodiments, the output module may be configured to generate a temporal trajectory of the operating point generated by the operating point module during operation of the apparatus and to determine or estimate an expected continuation of this trajectory in the future. On the basis of this expected trajectory, the output module may determine, in some embodiments, the time at which the operating point of the apparatus along the trajectory arrived at a position that is assigned or may be assigned to a classification volume indicating a fault state of the apparatus.

In this case, the output module may also be configured to indicate a time and/or a remaining period of time at which and/or after which the apparatus will presumably be in the fault state. In this manner, a user is assisted, by virtue of continuous man-machine interaction, not only in monitoring the actual state of the apparatus but also in predicting and possibly avoiding any future fault state.

The use of the support vector machine makes it possible to evaluate even a number of operating parameters with respect to whether the operating parameters indicate an instantaneous or even a future fault state of the apparatus. As a result of the fact that this may also be carried out during operation of the apparatus, the user is assisted during operation of the apparatus since the user is provided in this manner with an insight into the internal state of the apparatus that would otherwise have remained concealed from the user.

The support vector machine may be trained by labeled operating points in the n-dimensional operating parameter space, where the labels indicate the classification volume to which the corresponding operating parameter point should be assigned or the group (e.g., normal state, fault state 1, fault state 2, etc.) to which the corresponding operating parameter point is assigned.

According to a further aspect, the present embodiments provide an apparatus (e.g., an electrical machine) having a system according to the first aspect of the present embodiments. The electrical machine may be, for example, an electric motor and/or an electrical generator. Alternatively, the apparatus may also be a pump or a drive train, or may include a pump or a drive train, for example.

According to a further aspect, the present embodiments provide a computer program product containing executable program code that is configured such that the program code, when executed, implements the operating point module, the trained support vector machine, and the output module.

According to a further aspect, the present embodiments also provide a non-volatile computer-readable storage medium containing executable program code that is configured such that the program code, when executed, implements the operating point module, the trained support vector machine, and the output module.

According to embodiments, the operating parameters captured by the capture device include at least one (e.g., at least two) of the following operating parameters: an electrical voltage; an electrical current intensity; an acceleration; a linear acceleration; a rotational speed; a rotational acceleration; and a temperature.

For example, in some embodiments, the apparatus may be an electrical machine that may be characterized, for example, by the operating parameters of electrical voltage, electrical current intensity, rotational acceleration, and/or rotational speed.

The trained support vector machine is configured to divide the n-dimensional operating parameter space into at least three classification volumes, where the first classification volume indicates the normal state of the apparatus, and where the second classification volume and a third classification volume indicate different fault states of the apparatus. In this manner, an existing or predicted fault state may be determined and identified in an even more accurate manner.

In the case of three classification volumes, the classification volumes are separated from one another by the trained support vector machine by two-dimensional planes. In the case of four or more operating parameters, where three different fault states may be identified, for example, the classification volumes are separated from one another by the trained support vector machine by hyperplanes.

In some embodiments, the support vector machine is configured to use a linear kernel. In the technical field of support vector machines (e.g., if points to be classified are present or expected and cannot be linearly separated from one another), vector functions $\varnothing(\vec{x})$ are often used to transform input vectors $\vec{x}$ that represent the operating parameters in the operating parameter space into a usually higher-dimensional feature space in which the separation by the support vector machine is usually easier.

A decision function $D(\vec{x})$ may first be defined for an input vector $\vec{x}$ by $$D(\vec{x})=\vec{w}^T\vec{x}+b,$$

where $\vec{w}$ is an m-dimensional vector and b is a bias term. A decision may be defined, for example, by:

$$\vec{w}^Y\vec{x_i}+b\begin{cases} \geq 1 \text{ for } y_i=1 \\ <1 \text{ for } y_i=-1 \end{cases},$$

where each $y_i$ is a label for a training point $x_i$ (e.g., $y_i=1$ expresses the affiliation of the training point $x_i$ with a first class (label "1"), and $y_i=-1$ expresses the affiliation of the training point $x_i$ with a second class (label "−1")). A solution to the problem of finding the class boundaries may then be found with the establishment of the Karush-Kuhn-Tucker conditions.

Using a vector function $\varnothing(\vec{x})$ (e.g., "mapping function"), the decision function, instead of being defined for the feature space, may be defined by $$D(\vec{x})=\vec{w}^T\varnothing(\vec{x})+b.$$

This "mapping function" $\varnothing(\vec{x})$ may be used to define a kernel $K(\vec{x}, \vec{x}')$ by $$K(\vec{x},\vec{x}')=\varnothing^T(\vec{x})\varnothing(\vec{x}').$$

Instead of explicitly working with the mapping function $\varnothing(\vec{x})$, it is now possible to work with the kernel $K(\vec{x},\vec{x}')$ in order to determine the planes or hyperplanes separating the classification volumes.

For example, Karush-Kuhn-Tucker conditions may then be established using the kernel. This technique, according to which $K(\vec{x},\vec{x}')$ is used instead of the mapping function $\varnothing(\vec{x})$ when training the support vector machine and also during classification, is called kernel trick.

Linear Kernels Have the Form $$K(\vec{x},\vec{x}')=\vec{x}^T\vec{x}'$$

and do not cause any transformation of the input vector $\vec{x}$, which represents the operating parameter point, to a higher-dimensional space. In other words, the feature space has the same dimensionality as the original operating parameter space.

In some embodiments, the capture device is configured to capture the captured operating parameters as parts (e.g., fractional parts, fractions, or percentages) of a respectively corresponding operating parameter maximum value. In other words, the operating parameters may be normalized.

As explained in more detail below, this allows the significance of the individual operating parameters for the classification boundaries of the classification volumes (e.g., for the planes or hyperplanes) to be determined. From this, conclusions with respect to causes of faults may emerge.

In some embodiments, the computing device is configured to implement an evaluation module that is configured to: determine a respective normal vector to every plane or hyperplane that separates the first classification volume, which indicates the normal state of the apparatus, from a classification volume that indicates a fault state of the apparatus; and determine and output, for each of the determined normal vectors, a value of an entry with a greatest absolute value for the normal vector.

This entry with the greatest absolute value for the respective normal vector therefore indicates a change in which parameter results, at the earliest, in the operating point moving from a position inside the first classification volume (e.g., normal state) to the respective classification volume that is associated with the normal vector, and indicates a fault state.

In some embodiments, the method according to the second aspect of the present embodiments includes the following features and acts: the n-dimensional operating parameter space is divided by the trained support vector machine into at least three classification volumes, where the first classification volume indicates the normal state of the apparatus, and where the second classification volume and a third classification volume indicate different fault states of the apparatus.

The captured operating parameters may be captured, for example, as parts of a respectively corresponding operating parameter maximum value, as explained above. This involves the operating parameters being captured as absolute values and then being divided, either by the capture device itself or by an interposed computing unit with predetermined and stored respective operating parameter maximum values, in order to determine the corresponding parts (e.g., fractional parts, fractions, or percentages).

In addition, it is possible to determine a respective normal vector to every plane or hyperplane that separates the first classification volume, which identifies the normal state of the apparatus, from a classification volume that indicates a fault state of the apparatus. In addition, the value of the entry with the greatest absolute value for each determined normal vector is also determined and output. As explained above, this makes it possible to determine which operating parameter is particularly decisive for reaching the respective fault state.

For example, the apparatus may be an electrical machine (e.g., an electric motor) that is configured, for example, with at least one vibration sensor and at least one temperature sensor. Two or more vibration sensors may be arranged at different locations of the electric motor, and/or two or more temperature sensors may be arranged at different locations of the electric motor. Each measured value from each sensor of the electric motor may fill an entry (e.g., index) in an input vector. The respectively instantaneous input vector therefore constitutes a respectively instantaneous operating point of the electric motor.

If it is now the case, at a particular time, that the motor controller of the electric motor outputs the fault message indicating that the motor has failed, the described technique may be used to determine the location of the motor at which the problem occurred and whether the possible cause was more likely overheating (e.g., greater weighting of the temperature sensor data) or an excessively high vibration (e.g., greater weighting of the vibration sensor data).

In another example, the apparatus may be a pump (e.g., for wastewater) that, in the normal case, requires a particular amount of electrical current (e.g., first operating parameter) and a corresponding amount of electrical voltage (e.g., second operating parameter). Further, a temperature of the pump (e.g., third operating parameter) may be measured.

In a further example, the apparatus may be an electrical saw (e.g., a circular saw for woodworking). A motor temperature, a vibration, and a rotational speed may be measured and captured as operating parameters. If the saw fails, a high motor temperature, for example, may indicate general overloading or wear and tear of the motor as a cause; a severe vibration in combination with a high temperature may indicate wear and tear of the saw blade as a cause; and a slow rotational speed in combination with a low vibration may indicate the cause that wood to be sawn is too hard.

In yet another example, the apparatus may be a drive train of a vehicle (e.g., of an electric vehicle or a hybrid vehicle). An instantaneous speed may be measured as a first operating parameter, and an instantaneous torque may be measured as a second operating parameter at the drive train, for example. If the drive train is stopped, for example, on account of a maximum permissible torque being exceeded, it is possible to determine, for example, whether the cause is an excessive load on the axle or more likely an excessive acceleration.

Further, it is also possible to determine and output an organized list of the entries for each determined normal vector according to their magnitude (e.g., in each case, in conjunction with their index value so that it is possible to understand which entry belongs to which operating parameter) in order to obtain a hierarchy of the importance of the corresponding operating parameters for reaching the respective fault state. This may be of great advantage when evaluating the possible causes of faults (e.g., in a workshop).

The above configurations and developments may be combined with one another in any desired manner if expedient. Further possible embodiments, developments, and implementations of the invention also include not explicitly mentioned combinations of features of the invention that are described above or below with respect to the exemplary embodiments. For example, a person skilled in the art will also add individual aspects as improvements or additions to the respective basic form of the present invention.

DETAILED DESCRIPTION

Figure 1:
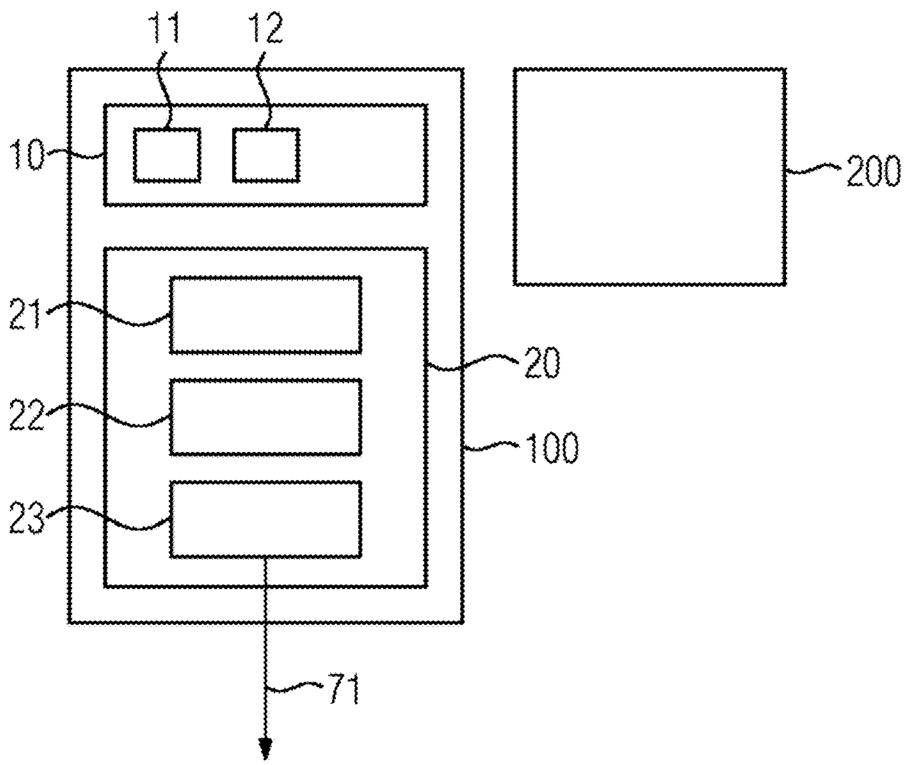
FIG. 1 shows a schematic block diagram of a system for determining a state of an apparatus according to one embodiment of a first aspect.

The accompanying figures are intended to convey a further understanding of the embodiments of the invention. The drawings illustrate embodiments and are used, in conjunction with the description, to explain principles and concepts of the invention. Other embodiments and many of the advantages mentioned emerge with regard to the drawings. The elements in the drawings are not necessarily shown in a manner true to scale with respect to one another.

In the figures, same, functionally same, and same acting elements, features, and components are each provided with the same reference signs, unless stated otherwise. The numbering of the method acts is used for better clarity and is not intended to be understood as a chronological sequence, unless explicitly or implicitly stated otherwise. For example, some method acts may also be carried out at the same time or in a reverse sequence.

FIG. 1 shows a schematic block diagram of one embodiment of a system 100 for determining a state of an apparatus 200. The apparatus 200 may be, for example, an electrical machine (e.g., an electric motor and/or generator). Alternatively, the apparatus 200 may also be a pump or a drive train of a vehicle (e.g., of an electric vehicle or a hybrid vehicle).

Although the system 100 and the apparatus 200 are shown separately from one another in FIG. 1, the apparatus 200 may include the system 100 for determining the state of the apparatus 200 in some embodiments. According to the present embodiments, it is also possible to provide a vehicle that includes both the system 100 and the system 200.

The system 100 is explained in more detail below using the example of an electric motor as the apparatus 200, where the described concepts are not restricted to such an apparatus 200.

The system 100 includes a capture device 10 that is configured to capture at least two operating parameters of the apparatus 200 during operation of the apparatus 200. For this purpose, the capture device 10 may respectively include, for example, a sensor 11, 12 that is respectively configured to capture the respective operating parameter.

As already described above, it is advantageous if the operating parameters are captured as parts of a respective operating parameter maximum value. The individual sensors 11, 12 may be configured, for example, such that the sensors 11, 12 already output the measured values as such parts.

Alternatively, the capture device 10 may also include a conversion unit (e.g., implemented by a processor, a microcontroller, an ASIC, or an FPGA) that is configured to convert the raw sensor data captured by the sensors 11, 12 into the corresponding parts. In the example of an electric motor as the apparatus 200, a first sensor 11 may be configured to capture a current applied to the electric motor 200, and a second sensor 12 may be configured to capture a voltage applied to the electric motor 200, for example.

The system 100 also includes a computing device 20 that is configured to implement an operating point module 21, a trained support vector machine 22, and an output module 23. The operating point module 21, the trained support vector machine 22, and the output module 23 may be implemented as software modules that are executed by the computing device 20. Optionally, the computing device 20 may also be configured to implement the evaluation module described above.

The computing device 20 may be, for example, a processor with an associated memory, a cloud computing platform, a microcontroller, an application-specific integrated circuit (ASIC), and/or the like.

The operating point module 21 is configured to generate an operating point in an n-dimensional operating parameter space from the at least two captured operating parameters (e.g., voltage and current intensity), where $n \geq 2$. This operating point, which, if the captured operating parameters are instantaneous operating parameters, constitutes an instantaneous operating point, may be used, according to the present embodiments, to indicate an instantaneous state of the apparatus 200.

For this purpose, the trained support vector machine 22 is configured and trained to divide the n-dimensional operating parameter space into at least two classification volumes that each indicate different states of the apparatus 200. Depending on the dimensionality of the n-dimensional operating parameter space, the class boundaries between classification volumes are straight lines (for n=2), planes (for n=3), or hyperplanes ($n \geq 4$).

For this purpose, the support vector machine is provided with training data having corresponding labels $y_i$ that assign a respective state (e.g., normal state, fault state 1, fault state 2, . . . ) to each of the training points $x_i$.

Figure 2:
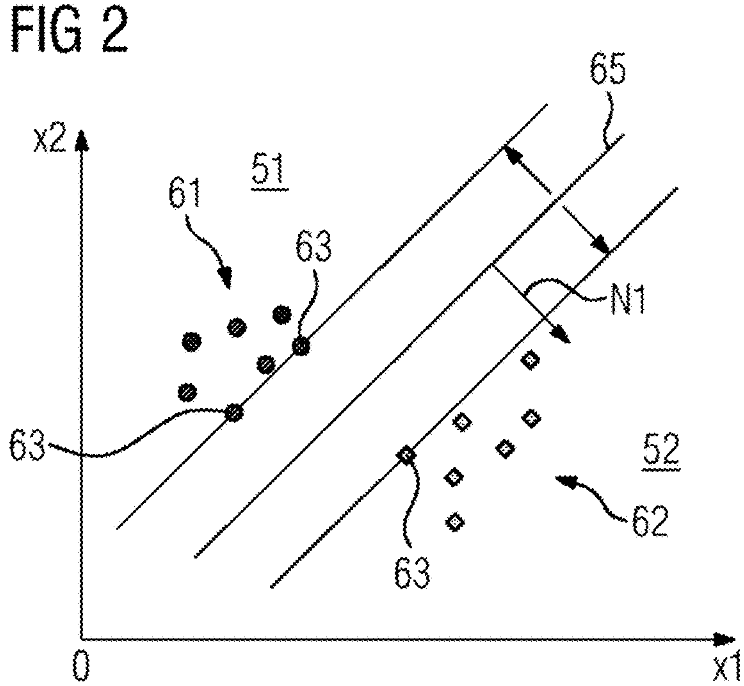
FIG. 2 shows a schematic illustration of an exemplary operating parameter space with training data.

FIG. 2 shows a schematic illustration of an operating parameter space with training data using the example of n=2 with two operating parameters x1, x2. In this case, a first operating parameter x1 is illustrated on the horizontal axis and indicates or represents a current intensity applied to the electric motor 200, for example. A second operating parameter x2 is plotted on the vertical axis and indicates or represents a voltage applied to the electric motor 200, for example.

First training points 61, which indicate a normal state of the apparatus 200, for example, are represented by circles in FIG. 2. Second training points 62, which indicate a fault state of the apparatus 200, are represented by rhombuses in FIG. 2. When training the support vector machine 22, an optimum straight line, plane, or hyperplane 65, which may divide the training points 61, 62 from one another such, that a maximum distance d1, d2 to the training points 61, 62 results, is determined.

The data points 63, both of the first training data 61 and of the second training data 62, which all have the shortest possible distance to the optimum straight line, plane or hyperplane 65, as illustrated in FIG. 2, are referred to as support vectors since the data points 63 would fundamentally suffice to train the support vector machine. The support vector machine also gets its name from these support vectors.

According to the statements above, the optimum straight line, plane, or hyperplane 65 divides the operating parameter space, which is spanned by the x1 axis and the x2 axis, into a first classification volume 51, which indicates a normal state, and a second classification volume 52, which indicates a fault state.

According to various known variants and developments of support vector machines, the support vector machine 22 may be configured as a soft margin support vector machine or a hard margin support vector machine, for example.

The trained support vector machine 22 is now able to assign any desired instantaneous operating point, which was formed by the operating point module, to one of the existing classification volumes 51, 52.

The methods described here may also be used with more than two classification volumes (e.g., three or more classification volumes 51, 52), where the first classification volume 51 always indicates the normal state, and where further classification volumes usually classify different fault states. It is also possible for there to be a plurality of classification volumes that are separate from one another and each indicate different normal states of the apparatus 200 (e.g., states that, although differing greatly in terms of operating parameters, are both acceptable during operation of the apparatus 200).

Referring again to FIG. 1, the output module 23 is configured to determine a state of the apparatus 200 according to the classification volume 51, 52 to which the generated operating point is assigned by the support vector machine, and to output an output signal 71 that indicates at least the determined state of the apparatus 200.

For example, as information, the output signal 71 may have a logic zero in order to indicate a normal state of the apparatus 200 and a logic one in order to indicate a fault state of the apparatus 200. In the case of more than one fault state of the apparatus 200 (e.g., more than three classification volumes 51, 52), the output signal 71 may have, for example, an item of binary-coded numerical information that clearly identifies and characterizes the state of the apparatus 200 (e.g., 0 ("00")-normal state, 1 ("01")-first fault state, 2 ("10")-second fault state, and so on).

The output module 23 may also be configured to determine, over a predetermined period or continuously, a trajectory of the operating point over the course of time in the n-dimensional operating parameter space and to extrapolate progression of the trajectory in the future.

On the basis of this, it is possible to determine the first time in the temporal progression at which the operating point presumably assumes a position in the n-dimensional operating parameter space that should be assigned to a state of the apparatus 200 other than the instantaneous state.

For example, it is possible to determine that, according to the extrapolated trajectory of the operating point, the operating point will change, in X minutes (e.g., four minutes), from the first classification volume 51, which indicates the normal state, into a position belonging to the second classification volume 52 that indicates a fault state. In other words, it is possible to extrapolate that the indicated fault state will accordingly occur in X minutes.

On the basis of this, the output signal 71 may include, for example, a time specification that indicates when at least a particular fault state will occur, when a change will take place between determined classification volumes 51, 52 (and which classification volumes), and/or what this change means.

For example, the different classification volumes 51, 52, that indicate different fault states of the apparatus 200 may indicate consecutively more serious fault states of the apparatus 200. The extrapolated trajectory may therefore indicate for each class boundary (e.g., the optimum straight line, plane, or hyperplane 65 that separates two classification volumes 51, 52 from one another) whether and when the operating point will intersect this according to the extrapolated trajectory, and may output a corresponding list.

This makes it possible to indicate to a user, for example, when a slight impairment in the function of the apparatus 200 will presumably occur (e.g., first fault state—operating point is assigned to the second classification volume 52), when a greater impairment will occur (e.g., second fault state—operating point is assigned to the third classification volume), and when a definitive failure of the function of the apparatus 200 will occur (e.g., third fault state—operating point is assigned to the fourth classification volume).

Figure 3:
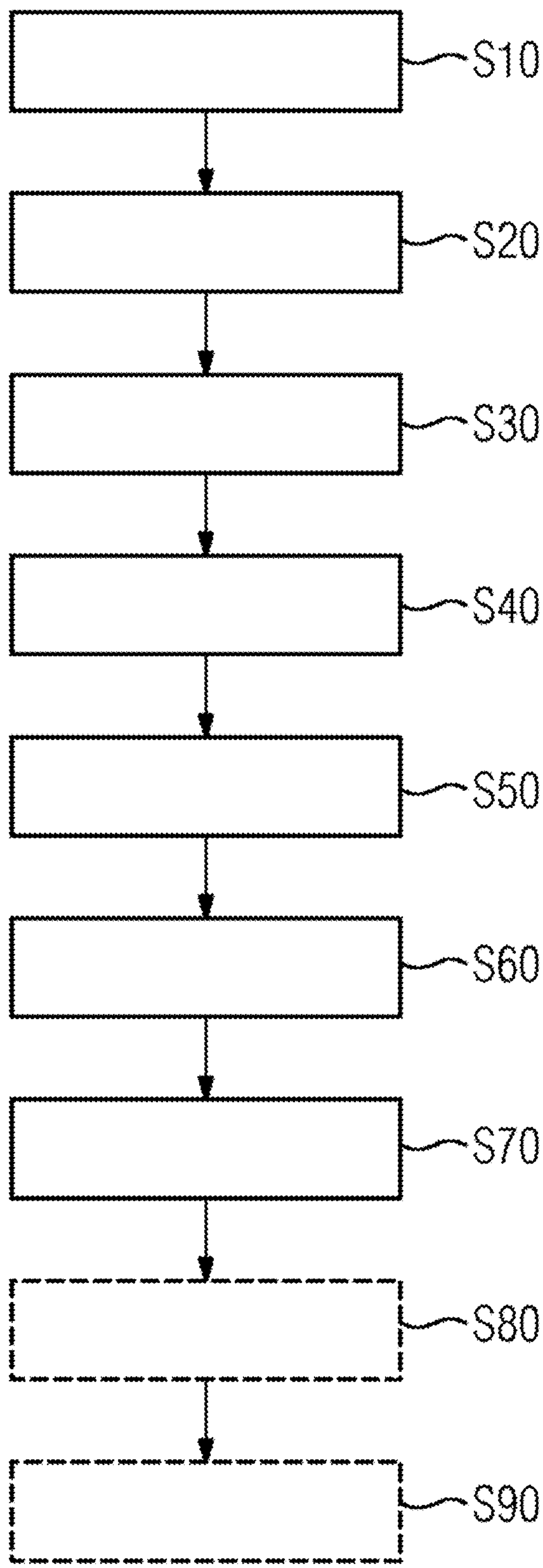
FIG. 3 shows a schematic flowchart for explaining a method for determining a state of an apparatus according to one embodiment of a second aspect.

FIG. 3 shows a schematic flowchart for explaining a method for determining a state of an apparatus 200 according to one embodiment of the second aspect of the present embodiments. The method according to FIG. 3 may be carried out, for example, by the system according to the first aspect of the present embodiments (e.g., using the system 100 according to FIG. 1).

The method according to FIG. 3 may therefore be adapted according to all variants, modifications, and options described with respect to the system according to the first aspect of the present embodiments and vice versa. In the description of the method according to FIG. 3, reference is sometimes also made to reference signs in FIG. 1 and FIG. 2 without this being intended to be understood as a restriction to the use with the system 100 according to FIG. 1.

In act S10, the apparatus 200 is operated. For example, an electric motor or a pump is switched on or the like.

In act S20, the at least two operating parameters x1, x2 of the apparatus 200 are captured during operation (e.g., as described above with respect to the capture device 10). For example, one operating parameter x1, x2 of the apparatus 200 may each be captured by a corresponding sensor 11, 12.

In act S30, an operating point is generated in an n-dimensional operating parameter space based on the at least two captured operating parameters, where $n \geq 2$. The operating point may be generated S30 as explained above with respect to the operating point module 21.

In act S40, the n-dimensional operating parameter space is divided into at least two classification volumes 51, 52 that each indicate different states of the apparatus (e.g., using a trained support vector machine 22). The division S40 of the n-dimensional operating parameter space may alternatively also be described as the generation of classification boundaries 65.

The support vector machine 22 may be trained, for example, as described above, with the result that a method for training a support vector machine for use in a system for determining a state of an apparatus 200 is also provided in the present case.

The n-dimensional operating parameter space is divided S40 such that a first classification volume 51 indicates a normal state of the apparatus 200 and a second classification volume 52 indicates a fault state of the apparatus 200. The n-dimensional operating parameter space may also be divided into further classification volumes that may indicate further fault states of the apparatus 200. The n-dimensional operating parameter space is divided S40, as is conventional with support vector machines, by calculating an optimum straight line, a plane, or a hyperplane 65, in each case, based on the dimension n of the operating parameter space.

The support vector machine may be, for example, in the form of a hard margin support vector machine (e.g., if the training data used may be linearly separated; if an (n−1)-dimensional class boundary may be drawn in the n-dimensional operating parameter space and defines the classification volumes 51, 52 such that each classification volume 51, 52 precisely and only includes the training data 61, 62 respectively assigned to this classification volume 51, 52).

In other cases, for example, if the training data 61, 62 cannot be linearly separated, the support vector machine may be, for example, in the form of a soft margin support vector machine (e.g., in the form of an L1 soft margin support vector machine or an L2 support vector machine).

In act S50, the support vector machine 22 determines that the generated operating point is assigned to one of the classification volumes 51, 52. This is usually carried out using a decision function.

In act S60, a state of the apparatus 200 is determined according to that classification volume 51, 52 in which the generated operating point is arranged.

In act S70, an output signal 71 indicating at least the determined state of the apparatus 200 is finally generated and output. As described above, the output signal 71 may contain further information (e.g., an expected time at which the instantaneous operating point will change from the classification volume in which the instantaneous operating point is currently situated to another classification volume and the like).

The method may also be used to more accurately determine the influences of the different operating parameters on the fault states of the apparatus 200. For this purpose, a respective normal vector that is perpendicular to the corresponding class boundary is determined (e.g., normalized to a length of 1) for each classification boundary (e.g., optimum straight line, plane, or hyperplane 65). The term "normal vector" does not relate to the normal state of the apparatus 200, for example, but rather, to the perpendicular arrangement with respect to the class boundary.

The individual entries for the normal vector at the different indices of the normal vector provide information on the direction in which the normal vector points in the operating parameter space, with the result that the absolute values thereof provide information on changes in which operating parameters x1, x2 cause a change between classification volumes in a particularly rapid manner.

Therefore, in an optional act S80, it is possible to determine a respective normal vector to each plane or hyperplane that separates the first classification volume from a classification volume that indicates a fault state of the apparatus.

In an optional act S90, the value of the entry with the greatest absolute value for each determined normal vector, together with the corresponding index value, may then be determined and output, with the result that it is clear (e.g., when processing a fault state of the apparatus 200 in a workshop or in a laboratory) which operating parameter x1, x2 should be checked as a matter of priority in order to find the cause of the fault state.

Acts S80 and S90 may be carried out, for example, by an evaluation module implemented by the computing device 20. Alternatively, acts S80 and S90 may also be carried out by an external evaluation device that is part of the system 100 and may be connected to the computing device 20 of the system.

If, as described above, a ranking of entries for the normal vector is output, the corresponding operating parameters x1, x2 may be checked in this order in order to provide that the most likely causes of faults are checked first. This makes it possible to considerably shorten a time needed to find causes of faults.

This procedure is particularly advantageous if the n-dimensional operating parameter space is divided by the trained support vector machine 22 into at least three classification volumes, where the first classification volume 51 indicates the normal state of the apparatus and the second classification volume 52 and a third classification volume indicate different fault states of the apparatus 200.

In act S80, it is possible in this case to determine a respective normal vector to each plane or hyperplane 65 that separates the first classification volume 51 from a classification volume 52 that indicates a fault state of the apparatus 200. The normal vectors therefore indicate on account of primarily which operating parameters x1, x2 the operating point would cross from the first classification volume (e.g., normal state) to in each case one of the classification volumes 52, which indicates a fault state of the apparatus 200.

In FIG. 2, for example, the normal vector N1 may be arranged such that the normal vector N1 points from the first classification volume 51 in the direction of the second classification volume 52. Since the classification boundary in FIG. 2 is an optimum straight line 65 that is defined, by way of example, by x1=x2, the normal vector is, for example, $(1/\sqrt{2}, -1/\sqrt{2})^T$, where the root of the scalar product of the vector with itself was used to determine the length of a vector and therefore of the normal vector. In another normalization scheme, the normal vector may be normalized such that the absolute values of entries of the normal vector add up to one.

Since a ranking of the absolute values of the entries for the normal vectors is used in the present case, it is not necessary to normalize the normal vector to a length of one. However, as described above, the captured operating parameters may each be captured as parts (e.g., as fractional parts) of a respectively corresponding operating parameter maximum value, where the respective operating parameter maximum values may be determined in advance and may be stored in the capture device 10 and/or the computing device 20. In other words, the operating parameters may each be captured as values between 0 and 1, both inclusive.

In the example in FIG. 2, the result is therefore that both operating parameters x1, x2 each have the same influence on possible migration of the instantaneous operating point from the first classification volume 51 to the second classification volume 52.

Figure 4:
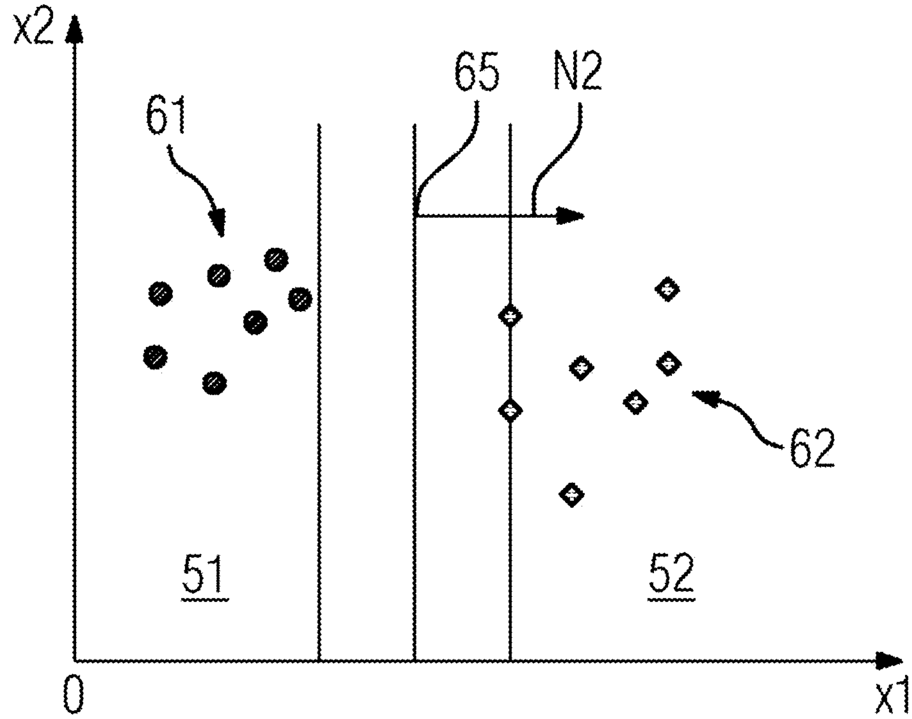
FIG. 4 shows a further schematic illustration of an exemplary operating parameter space with training data.

FIG. 4 schematically shows a variant of the situation illustrated in FIG. 2, in which the first training data 61 and the second training data 62 are such that the classification boundary (e.g., optimum straight line, plane, or hyperplane 65; a straight line in the present case) extends parallel to the vertical axis x2.

The normal vector N2 that is depicted in FIG. 4 and points from the first classification volume 51 in the direction of the second classification volume 52 is defined by N2=$(1,0)^T$. In the analysis, it therefore emerges that only the first operating parameter x1 is decisive for a movement of the instantaneous operating point from the first classification volume 51 to the second classification volume 52.

When checking the cause of a fault, it may therefore be possible in this case to completely dispense with checking the second operating parameter x2. Two extreme examples are illustrated in FIG. 2 and FIG. 4. Operating parameter spaces with a dimensionality of considerably more than n=2 will occur in reality, and a number of operating parameters x1, x2 will influence whether an instantaneous operating point will move from the first classification volume 51 in the direction of a classification volume 52 that indicates a fault state of the apparatus 200.

In the detailed description above, various features have been combined in one or more examples in order to improve the rigorousness of the illustration. However, the above description is of a merely illustrative but in no way restrictive nature. The above description is used to cover all alternatives, modifications, and equivalents of the various features and exemplary embodiments. Many other examples will be immediately and directly clear to a person skilled in the art on the basis of expert knowledge in view of the above description.

The exemplary embodiments were selected and described in order to be able to describe the principles on which the invention is based and possible applications in practice in the best possible manner. As a result, experts may modify and use the invention and various exemplary embodiments of the invention in an optimum manner with respect to the intended purpose.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A system for determining a state of an apparatus, the system comprising:

a capture device configured to capture at least two operating parameters of the apparatus during operation of the apparatus; and a computing device configured to implement an operating point module, a trained support vector machine (SVM), and an output module, wherein the operating point module is configured to generate an operating point in an n-dimensional operating parameter space from the at least two captured operating parameters, where n is greater than or equal to two, wherein the trained SVM is configured and trained to divide the n-dimensional operating parameter space into at least three classification volumes, each of the at least three classification volumes indicating different states of the apparatus, wherein a first classification volume indicates a normal state of the apparatus, and a second classification volume and a third classification volume indicate different fault states of the apparatus, wherein the trained SVM is further configured to assign the operating point generated by the operating point module to one classification volume of the at least three classification volumes, wherein the output module is configured to:

determine a state of the apparatus according to the one classification volume to which the generated operating point is assigned by the trained SVM; and output an output signal indicating at least the determined state of the apparatus, and wherein the computing device is further configured to implement an evaluation module, the evaluation module being configured to:

determine a respective normal vector to every plane or hyperplane that separates the first classification volume, which identifies the normal state of the apparatus, from one of the classification volumes that indicate a fault state of the apparatus; and determine and output, for each of the determined normal vectors, a value of an entry with a greatest absolute value for the normal vector.

2. The system of claim 1, wherein the at least two operating parameters captured by the capture device comprise:

an electrical voltage;

an electrical current intensity;

an acceleration;

a linear acceleration;

a rotational speed;

a rotational acceleration;

a temperature; or any combination thereof.

3. The system of claim 1, wherein the SVM is configured to use a linear kernel.

4. The system of claim 1, wherein the capture device is configured to capture the at least two captured operating parameters as parts of a respectively corresponding operating parameter maximum value.

5. An apparatus comprising:

a system for determining a state of the apparatus, the system comprising:

a capture device configured to capture at least two operating parameters of the apparatus during operation of the apparatus; and a computing device configured to implement an operating point module, a trained support vector machine (SVM), and an output module, wherein the operating point module is configured to generate an operating point in an n-dimensional operating parameter space from the at least two captured operating parameters, where n is greater than or equal to two, wherein the trained SVM is configured and trained to divide the n-dimensional operating parameter space into at least three classification volumes, each of the at least three classification volumes indicating different states of the apparatus, wherein a first classification volume indicates a normal state of the apparatus, and a second classification volume and a third classification volume indicate different fault states of the apparatus, wherein the trained SVM is further configured to assign the operating point generated by the operating point module to one classification volume of the at least three classification volumes, wherein the output module is configured to:

determine a state of the apparatus according to the one classification volume to which the generated operating point is assigned by the trained SVM; and output an output signal indicating at least the determined state of the apparatus, and wherein the computing device is further configured to implement an evaluation module, the evaluation module being configured to:

determine a respective normal vector to every plane or hyperplane that separates the first classification volume, which identifies the normal state of the apparatus, from one of the classification volumes that indicate a fault state of the apparatus; and determine and output, for each of the determined normal vectors, a value of an entry with a greatest absolute value for the normal vector.

6. A method for determining a state of an apparatus the method comprising:

operating the apparatus;

capturing at least two operating parameters of the apparatus during operation of the apparatus;

generating an operating point in an n-dimensional operating parameter space based on the at least two captured operating parameters, where n is greater than or equal to two;

dividing the n-dimensional operating parameter space into at least three classification volumes using a trained support vector machine (SVM), each of the at least three classification volumes indicating different states of the apparatus, wherein a first classification volume of the at least three classification volumes indicates a normal state of the apparatus, and a second classification volume and a third classification volume of the at least three classification volumes indicate different fault states of the apparatus;

assigning the generated operating point to a classification volume of the at least three classification volumes;

determining a state of the apparatus according to the classification volume to which the generated operating point is assigned;

outputting an output signal indicating at least the determined state of the apparatus;

determining a respective normal vector to every plane or hyperplane that separates the first classification volume from one of the classification volumes that indicate a fault state of the apparatus; and determining and outputting a value of an entry with a greatest absolute value for each determined normal vector.

* * * * *